United States Patent Office 3,424,758
Patented Jan. 28, 1969

3,424,758
CARBOALKOYPHENOXY AND CARBOALKOXY-PHENYLMERCAPTO-4-NITROPYRAZOLES
Leo Ralph Swett, Waukegan, Ill., Robert George Stein, Milwaukee, Wis., and Eugene Tatsuru Kimura, Morton Grove, Ill., assignors to Abbott Laboratories, Chicago, Ill., a corporation of Illinois
No Drawing. Application Dec. 8, 1966, Ser. No. 600,035, which is a continuation-in-part of application Ser. No. 529,201, Feb. 23, 1966. Divided and this application Dec. 19, 1967, Ser. No. 711,818
U.S. Cl. 260—310          3 Claims
Int. Cl. C07d 99/04, 99/06; A61k 27/00

ABSTRACT OF THE DISCLOSURE 5-(2-carboalkoxy phenoxy)- or 5-(2-carboalkoxy phenylmercapto)-4-nitropyrazoles, useful as intermediates in the preparation of 4,5-dihydro-1H-pyrazolo-[3,4-b] [1,4]-benzoxazepines or benzothiazepines, which in turn are useful as anti-inflammatory and anti-pyretic agents.

---

This application is a divisional application of application Ser. No. 600,035, filed on Dec. 8, 1966, which is in turn a continuation-in-part of application Ser. No. 529,201, filed on Feb. 23, 1966, now abandoned.

This invention is directed to a novel series of chemical compounds, and more particularly, to a novel series of substituted 4,5-dihydro-1,3-dimethyl-2H-pyrazolo-[3,4-b] [1,4]-benzoxazepines and pyrazolo-[3,4-b][1,4]-benzothiazepines, and to intermediates useful for making these compounds.

The new compounds of this invention may be represented by the formula

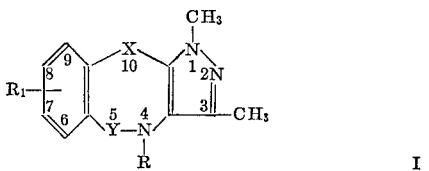

wherein X signifies oxygen, sulphur or sulfonyl; Y signifies carbonyl or methylene; R signifies hydrogen, straight and branched saturated and unsaturated loweralkyl, formyl and substituted-formyl, carbamoyl and substituted-carbamoyl, benzyl, benzoyl, diloweralkylaminoloweralkyl alkanol, acetyl and substituted acetyl, thiocarbamoyl and substituted thiocarbamoyl, β-(2-N-loweralkylpipedidino)-loweralkyl, di-loweralkylaminoloweralkyl and carbo-loweralkoxyloweralkyl; and $R_1$ signifies hydrogen, halogen, loweralkyl and loweralkoxy. The terms "loweralkyl" and "loweralkoxy" as used herein refer to carbon chains having 1 to 7 carbon atoms.

These compounds are prepared by reducing an appropriate intermediate compound represented by the formula

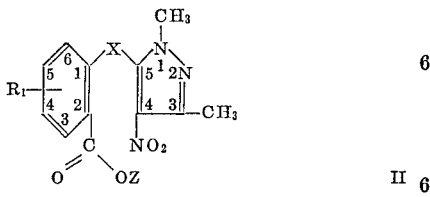

wherein X and $R_1$ are as previously defined and Z signifies loweralkyl and hydrogen. In general, the intermediates, wherein X is oxygen, are prepared by reacting an appropriately substituted salicylate with 5-chloro-1,3-dimethyl-4-nitropyrazole in an inert solvent under reflux temperatures. An ether linkage is formed between the oxygen atom from the hydroxyl group of the salicylate and the carbon atom at the 5-position of the pyrazole ring with the elimination of hydrochloric acid. Similarly, the intermediate wherein X is sulphur is prepared by reacting an appropriately substituted 2-mercaptobenzoate of the formula

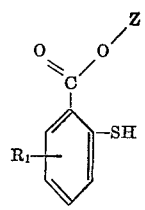

wherein Z is as previously defined, with 5-chloro-1,3-dimethyl-4-nitropyrazole. A thioether linkage is formed between the sulphur atom from the mercapto group on the benzoate ring and the carbon atom at the 5-position of the pyrazole ring with the elimination of hydrochloric acid. the intermediate wherein X is sulphur is prepared by reacting the corresponding pyrazolo-[3,4-b][1,4]-benzothiazepine intermediate by heating same in the presence of a strong oxidizing agent, such as hydrogen peroxide.

To convert the intermediates of Formula II to the compounds of Formula I, the intermediates are subjected to hydrogenation under heat, initially to reduce the nitro group on the pyrazole ring to an amine group. Continued heating in an inert solvent effectuates a ring closure between the amine group and the carboxyloweralkyl group on the phenyl ring forming an N-C linkage. This process will yield a compound of Formula I wherein Y is carbonyl and R is hydrogen. To form the various derivatives of this series, either of two general reaction schemes may be followed. If it is desired, the carbonyl group may first be reduced to a methylene group and subsequent substitutions may then be made for the R radical on the 4-position. Alternatively, the 4-position substitutions may first be made, followed by the subsequent reduction of the 5-carbonyl to methylene.

The nature of our novel compounds and processes will be better understood by reference to the following examples which are given to illustrate, but not to limit, the invention.

EXAMPLE 1

5-(2-carbomethoxyphenoxy)-1,3-dimethyl-4-nitropyrazole

To 600 ml. of dioxane is added 7.2 grams of sodium hydride (0.3 mole) dispersed in 7.2 grams of mineral oil and with stirring 45.6 grams (0.3 mole) methyl salicylate in 50 ml. of dioxane is added dropwise. After the addition is complete, the mixture is stirred for 3 hours at 80° C. Then, 52.5 grams (0.3 mole) of 5-chloro-1,3-dimethyl-4-nitropyrazole in 150 ml. of diozane is added dropwise and the mixture is stirred for 3 hours after the addition is completed. The mixture is then filtered and the solvent removed from the filtrate in vacuo. The residual oil solidifies and the crude product is crystallized from methanol to yield 62 grams (71%) of the 5-(2-carbomethoxyphenoxy)-1,3-dimethyl-4-nitro-pyrazole, melting at 92°–93° C.

EXAMPLE 2

5-(2-carbethoxyphenoxy)-1,3-dimethyl-4-nitropyrazole

The procedure of Example I is followed except that ethyl salicylate is added to the reaction instead of methyl salicylate. Crystallization from methanol yields 5-(2-carbethoxyphenoxy)-1,3-dimethyl-4-nitropyrazole having a melting point of 73.5°–75° C.

Various other derivatives of these intermediate compounds wherein $R_1$ (see Formula II) is halogen, loweralkyl and loweralkoxy may be prepared according to the procedure described in Example I. To form these derivatives, the correspondingly substituted methyl salicylate is used in place of the unsubstituted methyl salicylate. Table I below refers to Formula II above wherein X, Z and R, as defined in said table, and the identifying physical constant, e.g., melting points of the product.

TABLE I

| Ex. | X | Z | $R^1$ | M.P. in °C. |
|---|---|---|---|---|
| 3 | —O— | —CH$_3$ | -4-chloro | 107–108 |
| 4 | —O— | —CH$_3$ | -4-bromo | 124–125 |
| 5 | —O— | —CH$_3$ | -6-methyl | 135–137 |
| 6 | —O— | —C$_2$H$_5$ | -5-ethoxy | 111–112 |
| 7 | —O— | —CH$_3$ | -4-iodo | 136–137 |

EXAMPLE 8 o-Carboxyphenoxy-1,3-dimethyl-4-nitropyrazole

A mixture of 15 grams (0.041 mole) of 1,3-dimethyl-4-nitro-5-(2-carbomethoxyphenoxy)-pyrazole and 300 ml. of 10% hydrochloric acid is stirred and heated on a steam bath for 6 hours. The mixture is cooled and poured into 600 ml. of water where a solid precipitate forms. The solid is filtered and the filter cake washed well with water. The crude product is then crystallized from an ethanol-water solution to yield 7 grams of o-carboxyphenoxy-1,3-dimethyl-4-nitropyrazole having a melting point of 184°–186° C.

Examples 1–8 illustrate processes for making the compounds of Formula II wherein X is oxygen. The compounds of Formula II wherein X is sulphur are prepared in a similar manner except that methyl 2-mercaptobenzoate or a substituted derivative thereof is used in place of the methyl salicylate.

EXAMPLE 9

5,2-(carbomethoxyphenylmercapto)-1,3-dimethyl-4-nitropyrazole

In 300 ml. of water is dissolved 42 grams (0.5 mole) of sodium bicarbonate and to this solution is added a solution of 84 grams (0.5 mole) of methyl 2-mercaptobenzoate in 200 ml. of methanol with stirring. The mixture is stirred at reflux temperature for 2 hours and then cooled to room temperature. To this solution is added a solution of 87.5 grams (0.5 mole) of 5-chloro-1,3-dimethyl-4-nitropyrazole in 250 ml. of methanol dropwise, and the reaction mixture is refluxed overnight. The resulting solution is concentrated in vacuo to one-half volume. Upon cooling, a precipitate forms, which is then filtered, washed and dried. The crude product is crystallized from a methanol-water solution yielding 92 grams of 5-(2-carbomethoxyphenylmercapto-1,3-dimethyl - 4 - nitropyrazole, having a melting point of 113°–114° C.

In a similar manner, other thioether intermediates can be prepared by employing an appropriately substituted methyl 2-mercaptobenzoate. Hence, such compounds as: 5-(2-carbethoxyphenylmercapto)-1,3-dimethyl - 4 - nitropyrazole; 5 - (2 - carbomethoxy-4-chlorophenylmercapto-1,3-dimethyl-4-nitropyrazole; 5 - (2 - carbomethoxy - 6-methylphenylmercapto)-1,3 - dimethyl - 4 - nitropyrazole, among other can be prepared.

The various intermediates described above are useful in that these compounds are necessary for the preparation of other compounds exhibiting anti-inflammatory and anti-pyretic properties. In general, the intermediate is subjected to a hydrogenation reaction under pressure and heat, and in the presence of a hydrogenation catalyst, such as for example, platinum, palladium and Raney nickel, among others. The hydrogenation reaction effectuates a ring closure between the reduced nitro group on the pyrazole ring and the carboxylic acid group on the phenyl ring, forming an N-C linkage therebetween. The product which results is a compound of Formula I wherein Y is carbonyl and R is hydrogen. $R_1$ is, of course, determined by the particular derivative of methyl salicylate or methyl 2-mercaptobenzoate which is used in preparing the intermediate. The carbonyl group may be reduced to methylene and a variety of groups may be freely substituted for R on the 4-position and for $R_1$ on any position around the phenyl ring.

EXAMPLE 10

4,5-dihydro-1,3-dimethyl-1H-pyrazolo-[3,4-b][1,4]-benzoxampine-5-one

In an autoclave, 29.1 grams (0.1 mole) of 5-(2-carbomethoxyphenoxy)-1,3-dimethyl-4-nitropyrazole suspended in 250 ml. of 2-ethoxyethanol is hydrogenated with gaseous hydrogen in the presence of 6 grams of Raney nickel catalyst at 40 p.s.i. of hydrogen pressure. Upon completion of hydrogenization, the catalyst is removed by filtration and the filtrate concentrated to dryness. The residue is dissolved in 500 ml. of xylene containing 1 gram of p-toluenesulphonic acid, and refluxed for 6 hours. The solvent is then removed in vacuo and the solid residue washed several times with dilute hydrochloric acid solution followed by water. The solid residue is crystallized from an ethanol-water solution yielding 14 grams (59%) of the product, 4,5-dihydro-1,3-dimethyl-1-H-pyrazolo-[3,4-b][1,4]-benzoxazepin-5-one, having a melting point of 225°–226° C.

Following the procedure of Example 10, several other derivatives may similarly be made by subjecting the appropriately substituted intermediate to hydrogenation. Table II illustrates the intermediate utilized and the product resulting from the hydrogenation process along with the product's melting point. The notations for the radicals $R_1$, Z and X of the intermediates refer to the compounds of Formula II above, and the notations for $R_1$ and X refer to the compounds of Formula I above, where Y is carbonyl.

TABLE II

| Ex. | Intermediate | | | Product | | M.P. in °C. |
|---|---|---|---|---|---|---|
| | $R_1$ | Z | X | $R_1$ | X | |
| 11 | -4-bromo | —CH$_3$ | —O— | -7-bromo | —O— | 270–271 |
| 12 | -4-chloro | —CH$_3$ | —O— | -7-chloro | —O— | 265 |
| 13 | -6-methyl | —CH$_3$ | —O— | -9-methyl | —O— | 223–224 |
| 14 | -5-ethoxy | —C$_2$H$_5$ | —O— | -8-ethoxy | —O— | 207–208 |
| 15 | H | —CH$_3$ | —S— | H | —S— | 253–254 |

These compounds may further be reacted to substitute various groups for the hydrogen on the 4-position. Generally, the substitution is accomplished by reacting a compound of Formula I with the salt or acid of the R group to be substituted in an inert solution by which is meant one which does not participate in the reaction and does not react with any of the components of the reaction mixture. The resulting substituted compound is then filtered from the reaction mixture and crystallized from an appropriate solvent. This reaction is the same for compounds of Formula I wherein X is sulphur as well as oxygen, and Y is carbonyl. The following examples serve to illustrate this reaction.

EXAMPLE 16

4,5-dihydro-1,3-dimethyl-4-propargyl-1H-pyrazolo-[3,4-b][1,4]-benzoxazepin-5-one A suspension of 1.92 grams (0.04 mole) of a 50% mineral oil dispersion of sodium hydride in 100 ml. of dioxane is formed and 9.16 grams (0.04 mole) of 4,5-dihydro - 1,3 - dimethyl-1H-pyrazolo-[3,4-b][1,4]-benzoxazepin-5-one dissolved in 300 ml. of dioxane is added dropwise with stirring. The mixture is stirred at 80° C. for 2 hours, then cooled to room temperature. To this solution is added 4.8 grams (0.04 mole) of propargylbromide in 25 ml. of dioxane, dropwise with stirring until the addition is complete, and then stirred at room temperature for 5 hours. The mixture is filtered and the filtrate is concentrated in vacuo. The remaining oil is triturated with pentane to give a solid. The solid is dissolved in an ethanol-water solution and the product crystallized therefrom to yield 7.2 grams (67%) of 4,5-dihydro-1,3- dimethyl - 4 - propargyl-1H-pyrazolo-[3,4-b][1,4]-benzoxazepin-5-one having a melting point of 127°–128° C.

The procedure of Example 16 may be followed to make other 4-position substituted compounds of Formula I. The substitution reaction is basically the same for all the compounds of Formula I whether X is oxygen or sulphur and Y is carbonyl. In each case, an equivalent amount of the R-salt or R-acid and sodium hydride is used. Table III shows the reagent utilized for providing the R group, the product resulting and the melting point of each of the product compounds. The notations for X and R again have reference to Formula I above.

is added slowly to a stirring mixture of 2.75 grams (0.075 mole) of lithium aluminum hydride in 200 ml. of dry tetrahydrofuran. The mixture is refluxed for 4 hours then cooled in an ice bath. The excess hydride is decomposed by 2.7 ml. of water followed by 2.7 ml. of 15% sodium hydroxide followed by 8.1 ml. of water. After stirring for three hours, the reaction is filtered and the filtrate is concentrated yielding 6.8 grams of 4,5-dihydro-1,3-dimethyl-4-propargyl-1H-pyrazolo-[3,4-b][1,4]-benzoxazepine as a heavy viscous oil.

The reduction reactions described in Examples 32 and 33 may be repeated for any of the compounds of For-

TABLE III

| Ex. | Reagent | X | Product R | M.P. in °C. |
|---|---|---|---|---|
| 17 | Allyl bromide | —O— | —CH$_2$CH=CH$_2$ | 59–60 |
| 18 | 3-chloropropyldimethylamine | —O— | —(CH$_2$)$_3$N(CH$_3$)$_2$ | 98–100 |
| 19 | Benzyl bromide | —O— | —CH$_2$—  | 139–140 |
| 20 | 1-bromo-2-butyne | —O— | —CH$_2$C≡CCH$_3$ | 92–93 |
| 21 | Chloroacetamide | —O— | —CH$_2$C(=O)—NH$_2$ | 256–258 |
| 22 | Ethyl chloroacetate | —O— | —CH$_2$—C(=O)—OC$_2$H$_5$ | 156 |
| 23 | 2-[2-(1-methylpiperidinyl)]-ethyl chloride | —O— | —(CH$_2$)$_2$—  | (¹) |
| 24 | 3-chloropropanol | —O— | —(CH$_2$)$_3$OH | 143–145 |
| 25 | Bromoacetic acid | —O— | —CH$_2$COOH | 264–265 |
| 26 | Methyl bromide | —O— | —CH$_3$ | 135–136 |
| 27 | Methyl iodide | —S— | —CH$_3$ | 135–136 |
| 28 | Propargyl bromide | —S— | —CH$_2$C≡CH | 126–127 |
| 29 | β-Diethylaminoethyl chloride | —S— | —(CH$_2$)$_2$N(C$_2$H$_5$)$_2$·HCl | 205–206 ² |
| 30 | Benzyl chloride | —S— | —CH$_2$—  | (²) 153–154 |
| 31 | Allyl chloride | —S— | —CH$_2$CH=CH$_2$ | 126–127 |

¹ Viscous oil.
² HCl salt.

The carbonyl group at the 5-position may be reduced to a methylene group by reacting the compound with a strong reducing agent. The reduction may be carried out either before or after substitutions for the 4-position R radical have been made. The following examples illustrate the reduction process for compounds which are both substituted and unsubstituted at the 4-position.

EXAMPLE 32

4,5-dihydro-1,3-dimethyl-1H-pyrazolo-[3,4-b][1,4]-benzoxazepine

A mixture of 10 grams (0.25 mole) of lithium aluminum hydride in 800 ml. of tetrahydrofuran is placed in a three-necked round-bottom flask equipped with a Soxhlet extractor and stirrer, and 38 grams (0.166 mole) of 4,5-dihydro-1,3-dimethyl-1H-pyrazolo - [3,4-b][1,4]-benzoxazepin-5-one is placed in the Soxhlet extractor. The reaction mixture is refluxed for 16 hours, then cooled in an ice bath. The hydride is decomposed by the careful addition of 9.4 ml. of water followed by 9.4 ml. of 15% sodium hydroxide solution followed by 28.2 ml. of water. After stirring the reaction for several hours, the salts are removed by filtration. The filtrate is concentrated to an oil and distilled to yield 28 grams of 4,5-dihydro-1,3-dimethyl-1H-pyrazolo-[3,4-b][1,4]-benzoxazepine, having a melting point of 162° to 165° C.

EXAMPLE 33

4,5-dihydro-1,3-dimethyl-4-propargyl-1H-pyrazolo-[3,4-b][1,4]-benzoxazepine

A solution of 13.5 grams (0.05 mole) of 4,5-dihydro-1,3-dimethyl-4-propargyl - 1H - pyrazolo - [3,4-b][1,4]-benzoxazepin-5-one in 100 ml. of dry tetrahydrofuran mula I wherein Y is carbonyl regardless of whether the 4-position is substituted or unsubstituted, or whether X is oxygen or sulphur. If the reduction is carried out for a 4-position R unsubstituted compound of Formula I, the resulting reduced compound may then be subjected to a substitution reaction to substitute various R-groups on the 4-position. The following examples describe the reaction for carrying out a 4-position substitution of the reduced compounds of Formula I.

EXAMPLE 34

4,5-dihydro-1,3,4-trimethyl-1H-pyrazolo-[3,4-b][1,4]-benzoxazepine

A solution of 21.5 grams (0.10 mole) of 4,5-dihydro-1,3-dimethyl-1H-pyrazolo - [3,4-b][1,4] - benzoxazepine in 50 ml. of dry dioxane is added to a stirring mixture of 4.8 grams (0.10 mole) of sodium hydride in a 50% mineral oil dispersion. The reaction is heated to 70° C. in an oil bath for 2 hours, then cooled to 20° C. with an ice bath. A solution of 14.2 grams (0.10 mole) of methyl iodide is added slowly and the reaction is heated to 40° C. for three hours. The reaction mixture is then concentrated in vacuo to near dryness. To the resulting mixture is added 150 ml. of 5% hydrochloric acid and the aqueous mixture is extracted with ether. The aqueous portion is cooled and basified with a 10% sodium hydroxide solution and an oil layer forms which is extracted in 400 ml. ether. After filtering the ether solution from the drying agent, the ether is concentrated to an oil which crystallizes. One recrystallization from a C$_3$ to C$_7$ hydrocarbon mixture yields 15.6 grams of 4,5-dihydro-1,3,4-trimethyl-1H-pyrazolo-[3,4-b][1,4]-benzoxazepine melting at 70°–71° C.

EXAMPLE 35

4,5-dihydro-1,3-dimethyl-4-phenyl-carbamoyl-1H-pyrazolo-[3,4-b][1,4]-benzoxazepine A solution of 4.4 grams (0.037 mole) of phenyl isocyanate in 50 ml. ether is added slowly to a solution of 8 grams (0.037 mole) of 4,5-dihydro-1,3 - dimethyl-1H-pyrazolo-[3,4.b][1,4]-benzoxazepine in 250 ml. of ether. The reaction is stirred at room temperature for 12 hours and a solid forms. The solid is removed by filtration and recrystallized from ethyl acetate to yield 8.1 grams of 4,5-dihydro-1,3-dimethyl-4-phenyl carbamoyl-1H - pyrazolo-[3,4-b][1,4]-benzoxazepine having a melting point of 207° C.

Following the procedure of Example 35, various other 4-position R substitutions may be carried out to the compounds of Formula I wherein Y is methylene. Table IV below illustrates the starting material used to supply the R group to be substituted, the 4-position R radical of the product and the melting point of the product. This table refers to a compound of Formula I above having the formula

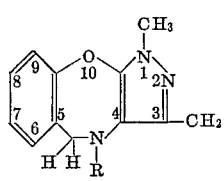

IV

TABLE IV

| Ex. | Starting material | R-group | M.P. in ° C. |
| --- | --- | --- | --- |
| 36 | Phenylisothiocyanate | $-\overset{S}{\underset{\parallel}{C}}-NH-\langle\text{phenyl}\rangle$ | 181–182 |
| 37 | Ethylisocyanate | $-\overset{O}{\underset{\parallel}{C}}-NHC_2H_5$ | 156–157 |
| 38 | Methylisothiocyanate | $-\overset{S}{\underset{\parallel}{C}}-NHCH_3$ | 229 |

EXAMPLE 39

4-p-chlorobenzoyl-4,5-dihydro-1,3-dimethyl-1H-pyrazole-[3,4-b][1,4]-benzoxazepine In 300 ml. of ether is dissolved 6.45 grams (0.03 mole) of 4,5-dihydro-1,3 - dimethyl-1H-pyrazolo-[3,4-b] [1,4]-benzoxazepine and 2.4 grams (0.03 mole) of pyridine. A solution of 5.25 grams (0.03 mole) of p-chlorobenzoyl chloride in 50 ml. of ether is added slowly to the ice-cooled solution. The reaction is stirred for 8 hours then filtered. The ether filtrate is washed successively with water; 5% hydrochloric acid solution; water; 5% sodium carbonate solution; and water. The ether solution is dried over magnesium sulfate and then concentrated to a solid. One recrystallization from ethanol yields 8.3 grams of 4-p-chlorobenzoyl-4,5 - dihydro-1,3 - dimethyl-1H-pyrazolo-[3,4-b][1,4]-benzoxazepine having a melting point of 178°–179° C.

The procedure of Example 39 is followed in making various other R substitutions at the 4-position of the compounds of Formula I wherein Y is methylene.

TABLE V

| Ex. | Starting material | R-group at 4-position | M.P. in ° C. |
| --- | --- | --- | --- |
| 40 | Ethyl chloroformate | $-\overset{O}{\underset{\parallel}{C}}-OC_2H_5$ | 106–107 |
| 41 | Benzoyl chloride | $-\overset{O}{\underset{\parallel}{C}}-\langle\text{phenyl}\rangle$ | 150 |
| 42 | Cyclopropyl carbonyl chloride | $-\overset{O}{\underset{\parallel}{C}}-\langle\text{cyclopropyl}\rangle$ | 113 |
| 43 | Acetyl bromide | $-\overset{O}{\underset{\parallel}{C}}-CH_3$ | 129–130 |
| 44 | Chloroacetyl chloride | $-\overset{O}{\underset{\parallel}{C}}-CH_2Cl$ | 121–122 |

EXAMPLE 45

4,5-dihydro-1,3-dimethyl-4-formyl-1H-pyrazolo-[3,4-b][1,4]-benzoxazepine

A solution of 75 ml. of ethyl formate and 6.45 grams (0.03 mole) of 4,5-dihydro-1,3-dimethyl-1H-pyrazolo-[3,4-b][1,4]-benzoxazepine is refluxed for 2 hours. The solution is then concentrated to an oil which crystallizes on cooling. One recrystallization from ethyl acetate yields 4.8 grams of 4,5 dihydro-1,3-dimethyl-4-formyl-1H-pyrazolo-[3,4-b][1,4]-benzoxazepine having a melting point of 108°–109° C.

EXAMPLE 46

4-chloroformyl-4,5-dihydro-1,3-dimethyl-1H-pyrazolo-[3,4-b][1,4]-benzoxazepine

Phosgene is gassed into 800 ml. of ethyl acetate and cooled in an ice bath. A solution of 47 grams (0.22 mole) of 4,5-dihydro-1,3-dimethyl-1H-pyrazolo - [3,4-b][1,4]-benzoxazepine is added rapidly forming a white solid. The reaction mixture is refluxed for 7 hours with phosgene gas introduced into the refluxing reaction mixture. The reaction mixture is filtered hot and the filtrate washed with 200 ml. of water. The ethyl acetate solution is dried over magnesium sulfate and the drying agent removed by filtration. The filtrate is concentrated to an oil which crystallizes on standing. One recrystallization from ethyl acetate yields 21 grams of 4-chloroformyl-4,5-dihydro-1,3-dimethyl-1H-pyrazolo-[3,4-b][1,4]-benzoxazepine having a melting point of 127°–129° C.

EXAMPLE 47

4,5-dihydro-1,3-dimethyl-4-(2-propynyl-carbamoyl)-1H-pyrazolo-[3,4-b][1,4]-benzoxazepine A solution of 2.2 grams (0.04 mole) of propargylamine dissolved in 25 ml. of ethyl acetate is added slowly to a solution of 4.56 grams (0.02 mole) of 4,5-dihydro-1,3-dimethyl-4-chloroformyl - 1H - pyrazolo - [3,4-b][1,4]-benzoxazepine. The reaction is stirred for 12 hours and then concentrated to dryness and the residue washed with water. One recrystallization from ethanol yields 3.2 grams of 4,5-dihydro-1,3-dimethyl - 4-(2-propynyl-carbamoyl)-1H-pyrazolo-[3,4-b][1,4]-benzoxazepine having a melting point of 170°–171° C.

Following the procedure of Example 47, other substituted urea and carbamoyl azide derivatives may be made by using the appropriate R-salt. For example, if azido formyl chloride is utilized, the resulting compound is 4,5-dihydro-1,3-dimethyl-4-azido formyl-1H-pyrazolo-[3,4-b][1,4]-benzoxazepine having a melting point of 76°–78° C. If the R-salt is carbamoyl chloride, the resulting compound is 4,5-dihydro-1,3-dimethyl-4-carbamoyl-1H-pyrazolo-[3,4-b][1,4]-benzoxazepine having a melting point of 253°–255° C.

EXAMPLE 48

4,5-dihydro-1,3-dimethyl-1H-pyrazolo-[3,4-b][1,4]-benzothiazepine

A mixture of 2.85 grams (0.075 mole) lithium aluminum hydride and 400 ml. of dry tetrahydrofuran is placed in a three-necked round-bottom flask equipped with a Soxhlet extractor and stirrer. The lactam, 4,5-dihydro-1,3-dimethyl-1H-pyrazolo-[3,4-b][1,4]-benzothiazepin-5-one is placed in the Soxhlet and the reaction mixture is refluxed for 12 hours. The reaction mixture is then cooled in an ice bath and the hydride decomposed by the successive addition of 2.7 ml. of water; 2.7 ml. 15% sodium hydroxide solution and 8.1 ml. of water. The mixture is stirred 2 additional hours, filtered and the filtrate concentrated to yield a yellow viscous oil. The crude oil is converted to the hydrochloride salt by conventional procedure. One recrystallization from ethanol yields 7.2 grams of 4,5-dihydro-1,3-dimethyl-1H-pyrazolo-[3,4-b][1,4]-benzothiazepine having a melting point of 212°–215° C.

Example 48 describes the process for reducing the compounds of Formula I wherein X is sulphur and Y is carbonyl to the corresponding compound wherein Y is methylene. As was previously stated, the processes described in the above examples may be utilized in reducing the 4-position, R substituted and unsubstituted compounds of Formula I whether X is oxygen or sulphur. Similarly, the methods for substituting various R groups at the 4-position of the reduced 4,5-dihydro-1,3-dimethyl-1H pyrazolo-[3,4-b][1,4]-benzothiazepine compounds are similar to the methods described for the corresponding benzoxazepine compounds.

EXAMPLE 49

4,5 - dihydro - 1,3 - dimethyl - 1H - pyrazolo - [3,4-b][1,4]-benzothiazepin-5-one 10,10-dioxide A solution of 75 ml. of glacial acetic acid, 18 ml. of 30% hydrogen peroxide and 7.35 grams (0.03 mole) of 4,5 - dihydro - 1,3 - dimethyl-1H-pyrazolo-[3,4-b][1,4]-benzothiazepin-5-one is heated on the steam bath for one hour and left to stand at room temperature overnight. The reaction mixture is poured into 400 ml. of water thereby forming a solid which is removed by filtration. One crystallization from an ethanol-water solution yields 5.5 grams of 4,5-dihydro-1,3-dimethyl-1H-pyrazolo - [3,4 - b][1,4] - benzothiazepin - 5-one 10,10-dioxide having a melting point of 269° C.

The novel compounds of Formula II are useful in that these compounds are necessary intermediates for making the compounds of Formula I. The new compounds of Formula I display pharmacological activity in that they are particularly useful as anti-inflammatory and anti-pyretic agents. When the carrageenin induced rat paw edema tests and the yeast anti-pyresis tests are conducted, these compounds display marked edemic inhibition and anti-pyretic effects. The following table illustrates the pharmacological activity of some of the compounds of Formula I, wherein $R_1$, X, Y and R are as defined.

TABLE

| Definition of radicals | Carrageenin induced rat paw edema test | | Yeast induced anti-pyresis test in rats | |
|---|---|---|---|---|
| | Oral dosage | Percent inhibition | Oral dosage | Percent reduction |
| $R_1$ and R=H<br>X=—O—<br>Y=—C(=O) | 25<br>50<br>100<br>$ED_{25}$=55 mg./kg.[1] | 9<br>23<br>45 | 25<br>50<br>100<br>$ED_{50}$=50 mg./kg.[2] | 0<br>43<br>33 |
| $R_1$=H<br>R=—CH$_2$=CH<br>X=—O—<br>Y=—C(=O) | 2.5<br>10<br>25<br>$ED_{25}$=14 mg./kg.[1] | 13<br>23<br>31 | 40<br>50<br>60<br>$ED_{50}$=46 mg./kg.[2] | 28<br>73<br>76 |
| $R_1$ and R=H<br>X=—O—<br>Y=—CH$_2$ | 10<br>25<br>50<br>$ED_{25}$=31 mg./kg.[1] | Neg.<br>17<br>52 | 5<br>10<br>25<br>40 | 5<br>27<br>70<br>71 |
| $R_1$=9-CH$_3$<br>R=—CH$_2$C≡CH<br>X=—O—<br>Y=—C(=O) | 25<br>50<br>100<br>$ED_{25}$=84 mg./kg.[1] | 7<br>5<br>34 | | |
| $R_1$=7-Cl<br>R=—CH$_2$CH$_2$—(piperidinyl with N-CH$_3$, S)<br>X=—O—<br>Y=—C(=O) | 25<br>50<br>100<br>$ED_{25}$=160 mg./kg.[1] | 10<br>19<br>17 | | |
| $R_1$=H<br>R=—CH$_2$CH=CH$_2$<br>X=—S—<br>Y=—C(=O) | 25<br>50<br>100<br>$ED_{25}$=64 mg./kg.[1] | 16<br>19<br>31 | | |

[1] $ED_{25}$ indicates the efficacy dosage at which 25% of the animals show curative effects.
[2] $ED_{50}$ indicates the efficacy dosage at which 50% of the animals show curative effects.

The lethal dosage of the 4,5-dihydro-1,3-dimethyl-1H-pyrazolo-[3,4-b][1,4]-benzoxazepin-5-one is 1025 mg./kg. of animal body weight, this figure representing the dosage at which 50% of the animals expire. The dosage of 4,5-dihydro-1,3-dimethyl-4-propargyl-1H-pyrazolo-[3,4-b][1,4]-benzoxazepin-5-one at which 50% of the animals expire is 570 mg./kg. of animal body weight. The ratio between the effective dosage level and the lethal dosage indicates that both of these compounds have a safe dosage margin. The other compounds of this series display similar pharmacological results.

Although this novel series of compounds may be prepared and administered in the free base form, some of the compounds of this invention may be prepared in the form of the non-toxic acid-addition salts thereof. For example, the compounds where Y is methylene and R is any group having a moiety other than a carbonyl group in the a carbon position easily form acid-addition salts such as the hydrochloride, sulfate, fumarate, oxalate and phosphate. These non-toxic acid-addition salts are, of course, pharmacologically acceptable to the animal host and may be administered in this form. The toxic salts of these compounds are also useful in that these may be utilized as intermediates in making the non-toxic salts or the free base form of these compounds.

We claim:
1. A compound of the formula

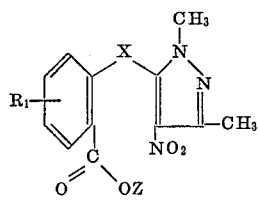

wherein X is a member selected from the group consisting of oxygen and sulphur; $R_1$ is a member selected from the group consisting of hydrogen, halogen, loweralkyl and loweralkoxy; and Z is a member selected from the group consisting of hydrogen and lower alkyl.

2. A compound according to claim 1 wherein X is oxygen; $R_1$ and Z are hydrogen.

3. A compound according to claim 1 wherein X is oxygen; $R_1$ is hydrogen and Z is methyl.

References Cited

UNITED STATES PATENTS

| 2,979,512 | 4/1961 | Wright | 260—310 |
| 3,190,888 | 6/1965 | Wolf et al. | 260—310 |
| 3,326,933 | 6/1967 | Wright | 260—310 |

OTHER REFERENCES

Kato et al.: Jour. Pharm. Soc. (Japan), vol. 77, pages 222–5 (1957).

Ponci et al.: Chem. Abst., vol. 59, columns 7478–9 (1963).

HENRY R. JILES, *Primary Examiner.*

NATALIE TROUSOF, *Assistant Examiner.*

U.S. Cl. X.R.

260—239.3, 293.4, 294.7, 999

UNITED STATES PATENT OFFICE
CERTIFICATE OF CORRECTION

Patent No. 3,424,758  January 28, 1969

Leo Ralph Swett

It is certified that error appears in the above identified patent and that said Letters Patent are hereby corrected as shown below:

In the heading to the printed specification, lines 2 and 3, "CARBOALKOYPHENOXY AND CARBOALKOXYPHENYLMERCAPTO-4-NITROPYRAZOLES" should read -- CARBOALKOXYPHENOXY AND CARBOALKOXYPHENYLMERCAPTO-4-NITRO-PYRAZOLES --.  Column 1, line 30, "-dimethyl-2H-" should read -- -dimethyl-1H- --; line 49, "-loweralkylpipedidino" should read -- -loweralkylpiperidino --.  Column 2, line 20, "sulphur is prepared by re" should read -- sulfonyl is prepared from --. Column 3, TABLE I, third column, line 5 thereof, "-CH$_5$" should read -- -CH$_3$ --; same column 3, line 35, "5,2-(" should read -- 5-(2- --; line 56, "chlorophenylmercapto-" should read -- chlorophenylmercapto)- --.  Column 4, line 6, "benzoxampine-" should read -- benzoxazepin- --; line 13, "hydrogenization" should read -- hydrogenation --.  Columns 5 and 6, TABLE III, opposite Ex. 17, "-CH$_2$CH-CH$_2$" should read -- -CH$_2$CH=CH$_2$ --; same table, opposite Ex. 20, "-CH$_2$C-CCH$_3$" should read -- -CH$_2$C≡CCH$_3$ --; same table, opposite Ex. 28, "-CH$_2$C-CH" should read -- -CH$_2$C≡CH --; same table, opposite Ex. 30, cancel "(2)"; same table, opposite Ex. 31, "-CH$_2$CH-CH$_2$" should read -- -CH$_2$CH=CH$_2$ --.  Column 7, line 8, "[3,4.b]" should read -- [3,4-b] --; lines 27 to 33, the portion of the formula reading

  should read  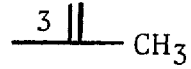

Column 8, TABLE V, opposite Ex. 42,

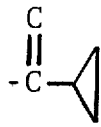  should read  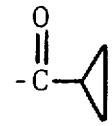

Signed and sealed this 24th day of March 1970.

(SEAL)
Attest:

EDWARD M. FLETCHER, JR.  
Attesting Officer

WILLIAM E. SCHUYLER, JR.  
Commissioner of Patents